United States Patent [19]

Walsh

[11] Patent Number: 5,202,899
[45] Date of Patent: Apr. 13, 1993

[54] APPARATUS FOR PROVIDING DYNAMIC SELECTION OF MODEM PROTOCOL TO SUPPORT MULTIPLE MODEM TYPES

[75] Inventor: James P. Walsh, Joliet, Ill.

[73] Assignee: Rockwell International Corporation, Seal Beach, Calif.

[21] Appl. No.: 746,395

[22] Filed: Aug. 16, 1991

[51] Int. Cl.$^5$ .............................................. H04B 1/38
[52] U.S. Cl. ...................................... 375/8; 395/500; 375/121
[58] Field of Search ................ 375/8, 121; 364/240.8; 395/500, 800; 379/93, 94; 340/825.31, 825.06

[56] References Cited
U.S. PATENT DOCUMENTS 5,136,716  8/1992  Harvey et al. ...................... 395/800

Primary Examiner—Curtis Kuntz
Assistant Examiner—Tesfacaet Bocure
Attorney, Agent, or Firm—C. B. Patti; V. L. Sewell; H. F. Hamann

[57] ABSTRACT

A computer is programmed in accordance with an algorithm which allows it to send a series of tentative unique initialization commands to a port which should be connected to a modem for the purpose of establishing what type of modem is connected if any. In accordance with an internal flag setting, an appropriate translation table is then used in any future communications with that modem to convert the basic commands used by the computer operated device to commands that will be recognized by the modem in setting up communications with other modems at the other end of a transmission line and for terminating said communications. The algorithm involved is also able to ascertain whether or not an operable modem is connected to a port by monitoring the response obtained. Thus, modems can be changed and potential technician error is eliminated due to the dynamic selection capabilities of the computer programmed to operate in accordance with the inventive concept algorithm.

2 Claims, 3 Drawing Sheets

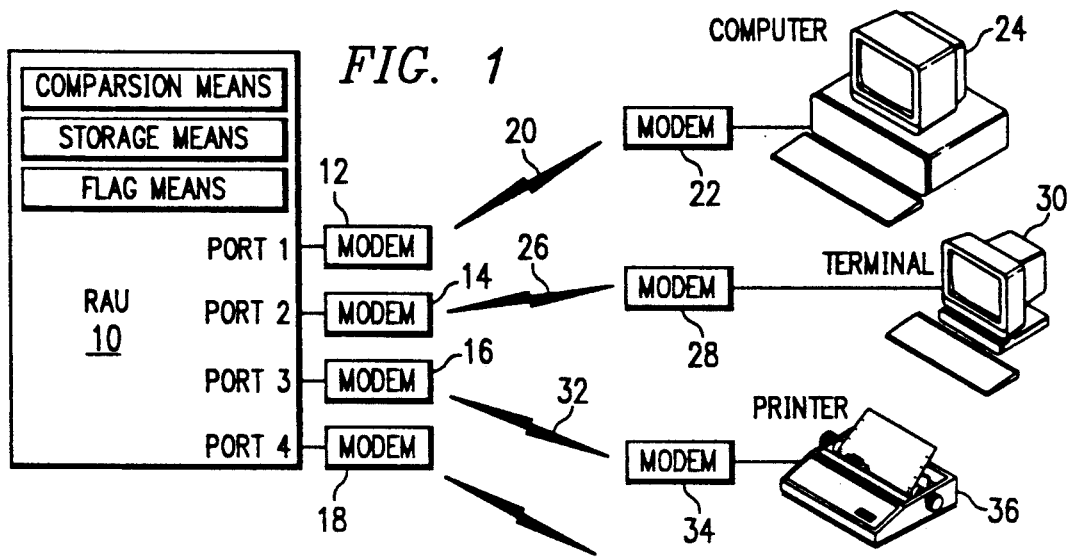

FIG. 1

INITIALIZATION COMMAND SEQUENCES AND EXPECTED RESPONSES  *FIG. 4*

|  | COMMAND SENT | EXPECTED RESPONSE |
|---|---|---|
| HAYES/AT | "AT+(OPTIONS)+<CR>" | "OK<CR>" |
| MOTOROLA/EN | "EN<CR>" | ":" |
| MOTOROLA/NON-AUTODIAL | DEFAULT MODEM TYPE | NONE |

MODEM COMMAND TRANSLATION TABLES  *FIG. 5*

| COMMAND TYPE | HAYES/AT | MOTOROLA/EN | MOTOROLA/NON-AUTODIAL |
|---|---|---|---|
| DIAL | "ATD" | "D" | ":" |
| PAUSE | "," | "D" | STX |
| WAIT FOR DIAL TONE | "W" | "W" | ":" |
| END OF CMMD | "<CR>" | "<CR>" | "?" |

MODEM RESPONSE TABLES  *FIG. 6*

| RESPONSE | HAYES/AT | MOTOROLA/EN | MOTOROLA/NON-AUTODIAL |
|---|---|---|---|
| CALL COMPLETE (0-300bps) | "1" | "C" | "3" |
| CALL COMPLETE (1200bps) | "5" | "C" | "3" |
| BUSY | "7" | "B" | "B" |
| NO CARRIER | "3" | "E" | "E" |
| COMMAND ERROR | "4" | "E" | "E" |
| NO DIAL TONE | "6" | "D" | "D" |
| NO ANSWER-BACK TONE | "3" | "T" | "T" |
| ABORT | "4" | "A" | "A" |

APPARATUS FOR PROVIDING DYNAMIC SELECTION OF MODEM PROTOCOL TO SUPPORT MULTIPLE MODEM TYPES

THE INVENTION

The present invention is generally related to electronics and more specifically related to the transmission of signals between a given digital signal output device through a transmission medium to another digital signal device. Even more specifically, the present invention is related to a dynamic selection algorithm utilized in the digital device to determine what type of modem is connected, if any, so as to use the correct command set, appropriate to the connected modem, in conjunction with any instructions sent to, or expected from, the modem in the course of setting up, continuing or completing any communications.

BACKGROUND

Communications between digital devices over various transmission means, such as telephone lines and microwaves, require the use of modems to convert the digital signals from the device into a modulated signal of the type appropriate for the transmission medium. The devices with which applicant is familiar have in the past always been designed to use the same type modem on all output ports. If another modem type requiring a different command set were to be used, a different board would be inserted into the device to interface with the new modem types. It would, of course, be beneficial to allow any type of modem to be connected to any given port on a digital device without changing out printed circuit boards and being able to take advantage of the physical availability of different types of modems as they occur. An obvious solution to such a situation would be to install some type of switch at each output port of the digital device, which could be set to a setting corresponding with a command set for each of several different modems. The digital device could then check the switch setting and use commands appropriate to the setting. However, such a solution would still be subject to technician errors or omissions in getting the setting right and, further, would not take care of the possibility that, instead of a wrong switch setting, a modem is inoperative or removed.

The present invention attacks the problem by keeping a list of all modem types, to be used, within storage means of the digital device and the associated command sets used for each type. Further, a unique initialization command for each modem type is kept in storage whereby the modem can be interrogated and the expected response checked for each of the modem types in succession until it is accurately known which modem type is connected. Further, if the commands issued result in no response or prescribed given response, it can be determined whether the modem is inoperative or is not connected and appropriate error signals activated.

It is, therefore, an object of the present invention to provide an improved interface between a digital device and modems to be connected thereto, whereby a dynamic modem selection algorithm is employed to logically ascertain the modem type and thus, the selection of appropriate command sets to be used with the modem.

Other objects and advantages of the present invention will be apparent from reading the specification and appended claims in conjunction with the drawings wherein:

FIG. 1 is a block diagram of a digital device connected through modems to various other digital devices;

FIG. 4 is a chart of initialization command sequences and expected responses;

Figure 2:
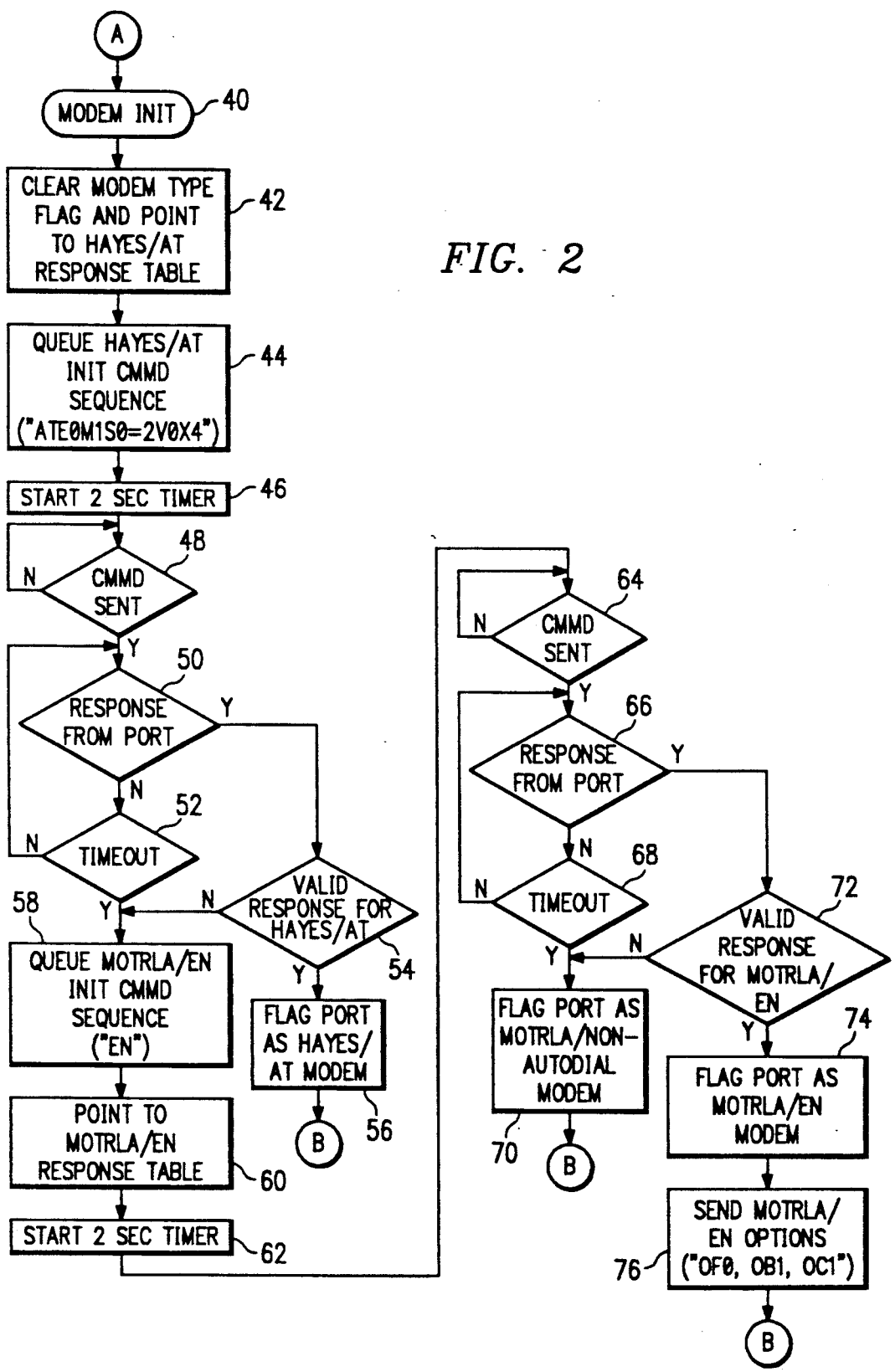
FIG. 2 is a flow diagram of a portion of the algorithm comprising the present inventive concept.

FIG. 5 comprises modem command translation tables for each of the modem types given in FIG. 4; and FIG. 6 is a modem response table for expected responses from each of the modems or modem types listed in FIG. 4.

DETAILED DESCRIPTION

In FIG. 1 a random access unit or RAU 10 is illustrated with four ports, 1 to 4. Port 1 is connected to a modem 12, while ports 2, 3 and 4 are connected to modems 14, 16 and 18, respectively. A transmission line, telephone line or other communication means 20 is connected between modem 12 and a modem 22, which is connected to a computer 24. Modem 14 is connected by a transmission line 26 to a modem 28 and a video terminal 30. Modem 16 is connected via a transmission line 32 and a modem 34 to a printer 36. Modem 18 is merely shown connected to a transmission line with nothing connected at the other end. Block 10 illustrates internally three blocks, one labeled comparison means, one labeled storage means and one labeled flag means. These blocks are not enumerated since they merely indicate that the computer is programmed to perform the functions of comparing, storing and flagging certain items.

Figure 3:
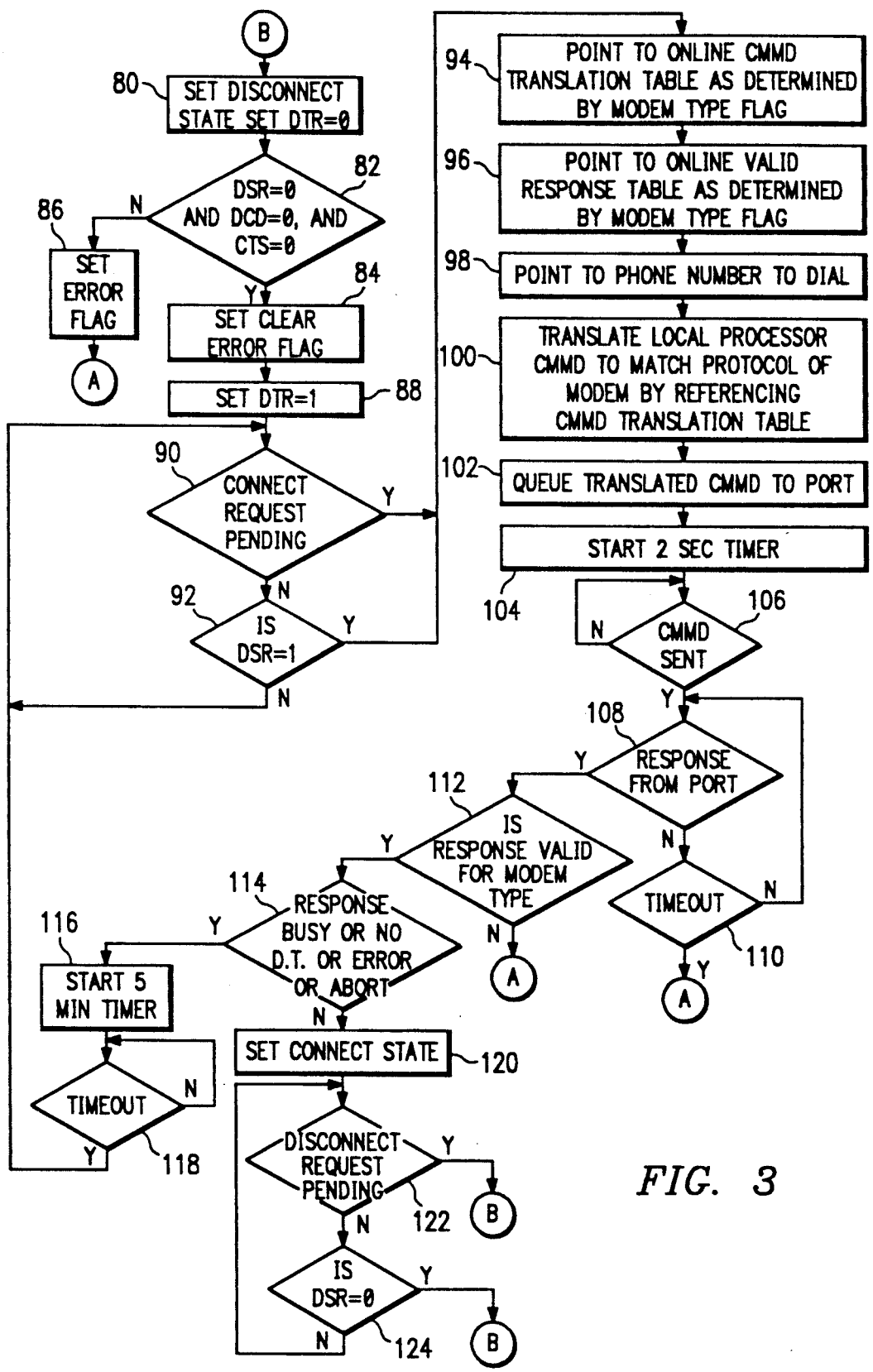
FIG. 3 is a further flow diagram to be used with the flow diagram of FIG. 2 in describing the present concept.

In FIG. 2, a modem initialization block 40 is shown with an A input due to a failure or error condition from one of several portions of the flow diagram of FIG. 3. The device would also enter the modem initialization block 40 upon TURN ON of the unit. The process commenced by block 40 advances to a block 42, where the modem type flag is cleared and a pointer is set to the first modem type in the pointer table of FIG. 4. This happens to be a Hayes/AT type modem. The algorithm proceeds to block 44, where an initialization command sequence is sent, as shown both in block 44 and in FIG. 4 as AT plus certain options and a carriage return. A two-second timer is started, as shown in block 46, to allow the command sequence to be sent. This waiting is accomplished by the decision block 48. Once the command has been sent, the algorithm proceeds to block 50 to check any response being received by the port from the modem, such as modem 12 of FIG. 1. A loop is formed between decision block 50 and time-out block 52. If a response is received, the path to a decision block 54 is pursued and the response is checked to see if it is a valid response for a Hayes/AT type modem. If it is a valid response, which as shown in FIG. 4 would be ok and a carriage return, the algorithm proceeds to block 56, where the port 1 would be flagged as having connected thereto a Hayes/AT modem. The program would then proceed to the B input of FIG. 3. On the other hand, if the time-out occurred without receiving a response, or if it was determined the response was not appropriate for a Hayes/AT modem in decision block 54, the algorithm would proceed to queue a Motorola/EN initialization command sequence, as shown by block 58. This is shown as the second modem type in FIG. 4. The pointer is reset to the Motorola/EN position in the table of FIG. 4, as set forth by block 60. A two-second timer is started as illustrated in block 62 and the algorithm proceeds to a decision block 64. Once the command is sent, the algorithm proceeds to a block 66 to run through a loop between decision block 66 and a decision block 68 until time-out occurs or a response is received. If time-out occurs, it proceeds to a block 70, where it flags the port as a Motorola/non-autodial modem and goes to FIG. 3. If a response is received that is not valid for a Motorola/EN block, as set forth in decision block 72, it also goes to block 70. However, if the response is valid for a Motorola/EN, or in other words, is a colon as set forth in FIG. 4 as an expected response, the algorithm proceeds to flag the port as a Motorola/EN modem, as set forth in block 74. While the options for the Hayes modem could be sent as part of the initialization command, in the case of a Motorola type modem, the options are sent after the initial command sequence and are sent according to a block 76. The algorithm then proceeds to the B input of FIG. 3.

As will be noted, a Motorola non-autodial type modem does not provide a return response. For one embodiment of the inventive concept, all the commands from the RAU 10 were the Motorola non-autodial commands and, thus, if no response was received, it would be assumed that it was a Motorola non-autodial type modem as set forth in FIG. 4.

Proceeding now to FIG. 3, it will be noted that a first block 80 is the entry point for the flow diagram of FIG. 3 and in block 80 the state is set to disconnect and DTR (data terminal ready) is set to zero. The flow diagram proceeds to a decision block 82, where various items are checked. If the DSR (data set ready) is equal to zero and also the DCD (data carrier detect) is set to zero and, further, the CTS (clear to send) is set to zero, then the clear error flag is set in a block 84. However, if any one of these items is not set to zero, an error flag is set in a block 86 and the control returns to block 40 of FIG. 2 to try and establish a given modem. The set error flag would typically indicate that there is no modem attached. From block 84, the algorithm proceeds to a block 88, where the data terminal ready is set to 1. If any of the three referenced items in decision block 82 is set to a 1, there is a hardware error either in RAU 10 or the associated modem such as 12, since, at this time, none of these conditions should be anything other than zero. In other words, there is no carrier, the data set is not ready and there should not be any data to be sent or, in other words, CTS should be zero. Once the data terminal ready flag is set to a 1 as set forth in block 88, the program proceeds to a decision block 90, where it checks to see if there is a connect request pending from something internal to RAU block 10. If there is not, the program proceeds to a decision block 92 to see if data set ready is set to a 1. If it is not, it proceeds back to decision block 90 and stays in this loop until data is ready to send. If either there is a request pending or the data set ready is is to a 1, the program proceeds to a block 94. A pointer is set to the appropriate type modem of the translation table FIG. 5, as determined by the modem type flag in the table of FIG. 4. The algorithm then proceeds to block 96, to point to the on-line valid response table, as determined by the modem type flag. This table is set forth in FIG. 6. A pointer is then set to a telephone number to dial, as set forth in block 98.

Since the pointer has been placed to the appropriate translation table, as previously indicated in block 94, the process can proceed to a block 100, where the local processor commands are translated to match the protocol of the modem found to be connected using the translation table set forth in FIG. 5. The process can then proceed to block 102, where the translated commands are cued to the port, such as port 1. A two-second timer is then started in a block 104 and a loop is formed around a decision block 106 until the command is sent. Once the command is sent, the algorithm proceeds to a decision block 108, where a response from a port is awaited. The process proceeds to a time-out decision block 110 and loops these two decision blocks until either a time-out occurs, at which time it proceeds back to the modem initialization block 40 of FIG. 2 or, if a response is received, it proceeds to a decision block 112. If the response is not valid for the modem type indicated by the pointer of FIG. 4, it returns to FIG. 2 and reinitializes the modem. If the response is valid, it proceeds to a decision block 114 and checks to see if the response is busy or there is no dial tone or there is an error or an abort signal. If any of these conditions exist, it then proceeds to start a five-minute timer in a block 116 and then proceeds to a decision block 118 forming a time-out loop. After the five-minute time-out is completed, it returns to the decision block 90 to see if there is a connect request pending. Returning now to decision block 114, if there is dial tone and there is no error abort flag and the response is not busy, then the process proceeds to set the state to connect in a block 120 and it proceeds to a decision block 122 to check if a disconnect request is pending. If it is not, it proceeds to a decision block 124. If a disconnect request is pending, it returns to block 80 to set the disconnect. If, on the other hand, there is no disconnect pending, it proceeds to block 124 and checks to see if the data set ready is set to zero and, if it is not, it remains in the loop until one of the two criteria of decision blocks 122 and 124 are met, where upon it returns to block 80 to set up a new communication.

As implied in the previous discussion, FIG. 4 comprises a listing of three types of modems used in one embodiment of the invention and a unique command that is sent for the first two, along with their unique expected responses. Since, in one embodiment of the invention, the RAU 10 used a default set of commands and expected responses that were identical to the Motorola non-autodial, no command needed to be sent in the implementation as presented by the algorithm. However, a more universal approach would be to have unique commands for all expected modems. Only minor additions to FIG. 2 would be required to accomplish an additional checking of the Motorola non-autodial modem at this time.

FIG. 5 illustrates the translation tables of the various commands such as dial pause, wait for dial tone and end of command for each of the two modem types Hayes/AT and Motorola/EN as compared to the default commands contained in the RAU 10 and listed under Motorola/non-autodial.

FIG. 6 provided an indication of the various modem responses that might occur from each of the three listed modem types as set forth in FIG. 4.

OPERATION

Although it is believed that the operation of the algorithm presented thus far is self evident from the flow diagrams of FIGS. 2 and 3 in conjunction with the drawing of FIG. 1 and the tables of FIGS. 4–6, a brief review will be provided. When the system decides to try and find out what type of modem is connected, it proceeds to the first modem type in the list of FIG. 4 and sends a unique initialization command. If it gets a response expected for that of type of modem, a flag is set such as shown in block 56 and the system then proceeds to check for hardware or other errors and, if none are found, it is believed by the software that everything is in workable order and it checks to see whether or not there are any communications to be dealt with. When a given communication is completed, it returns to decision block 80 if there is a disconnect request pending or the data set ready is set to zero. If it gets an invalid response, it returns to FIG. 2 to reinitialize or if there is a busy response, it returns to decision block 90 and proceeds from that point.

In summary, the present invention is directed towards the general concept of interrogating a port to which a modem is supposed to be connected with enough unique initialization commands to define what type of modem is connected thereto, whether or not a connected modem is operable or in the alternative disconnected. Internally stored tables can then be utilized on a selection basis in accordance with the previously ascertained logic to dictate a translation table to be used so that any future communications with the modem are recognizable by that modem due to a pointer or some other type of indication being set for the appropriate translation and response tables. Although the present invention assumes that if the appropriate response is not received from the first N minus 1 modems, that the only possible alternative is the last modem on the list, the inventive concept includes checking all modems on the list, if one wants to use the additional programming space necessary to provide such a check.

While the prior art required all modems connected to an RAU to be of the same type, the present concept allowed each port to be connected to a different modem if there are enough different command types listed in the various tables. This further allows the replacement of a defective modem with a modem of a different type without the possibility of the technician forgetting to change any necessary hardware switches and etc. since the system will automatically reset the internal flag for that port upon the next error being detected.

While I have disclosed a given embodiment of the invention, I wish to be limited, not by the invention as disclosed in the drawings, but only by the scope of the appended claims wherein

I claim:

1. Apparatus for connection to any one of a plurality (N) of modem (modulator-demodulator) types incorporating means for recognizing the type connected, comprising in combination:

a plurality of output ports for connection to a plurality of modems;

storage means for maintaining a list of N types of modems that may be used with said apparatus:

multi-setting flag means, including control input means, for stepping through N flag types as set forth in the list of said storage means from first to last in response to input signals applied to said control input means;

signal transmission means, connected to said flag means, for generating and transmitting a set of initialization commands in accordance with the setting of said flag means, from a given output port for application to a modem where the response expected is unique for each of the flag settings;

signal reception means, connected to said flag means, for decoding any response received at said given output port;

comparison means, connected to said flag means and said signal reception means, for checking any received response against that expected from the setting of said flag means and for providing an output indicative of whether or not the comparison was positive;

flag changing means, connected to said comparison means and said multi-setting flag means, for IF
   the last received response was not as expected,
AND IF
   said flag means is set to other than the N-2 modem type as set forth in said list contained in said storage means,
THEN
   changing the setting of said multi-setting flag means to indicate a further type of modem as listed in said storage means and returning control to said signal transmission means to transmit a further set of initialization commands in accordance with said flag means,
OTHERWISE
   changing the multi-setting flag in said storage means to indicate the final type modem as the only choice remaining; and
ENDIF means for transmitting signals from said output port to a connected modem in accordance with the setting of said multi-setting flag means for establishing that a connected modem is in operational condition for communications.

2. Apparatus for connection to any one of a plurality (N) of modem (modulator-demodulator) types incorporating means for recognizing the type connected, comprising in combination:

a plurality of output ports for connection to a plurality of modems;

storage means for maintaining a list of N types of modems that may be used with said apparatus:

multi-setting flag means, including control input means, for stepping through N flag types as set forth in the list of said storage means from first to last in response to input signals applied to said control input means;

signal transmission means, connected to said flag means, for generating and transmitting a set of initialization commands in accordance with the setting of said flag means, from a given output port for application to a modem where the response expected is unique for each of the flag settings;

signal reception means, connected to said flag means, for decoding any response received at said given output port;

comparison means, connected to said flag means and said signal reception means, for checking any received response against that expected from the setting of said flag means and for providing an output indicative of whether or not the comparison was positive;

flag changing means, connected to said comparison means and said multi-setting flag means, for performing function of changing the setting of said multi-setting flag means to indicate a further type of modem as listed in said storage means and returning control to said signal transmission means to transmit a further set of initialization commands in accordance with said flag means, if the last received response was not as expected, and if said flag means is set to other than the second to the last modem type as set forth in said list contained in said storage means, and otherwise performing the function of changing the multi-setting flag in said storage means to indicate the final type modem as the only choice remaining; and means for transmitting signals from said output port to a connected modem in accordance with the setting of said multi-setting flag means for establishing that a connected modem is in operational condition for communications.

* * * * *